Sept. 16, 1952          E. LEVY, JR          2,610,991
PHASE BALANCE OF 3 PHASE INVERTER
Filed April 3, 1951
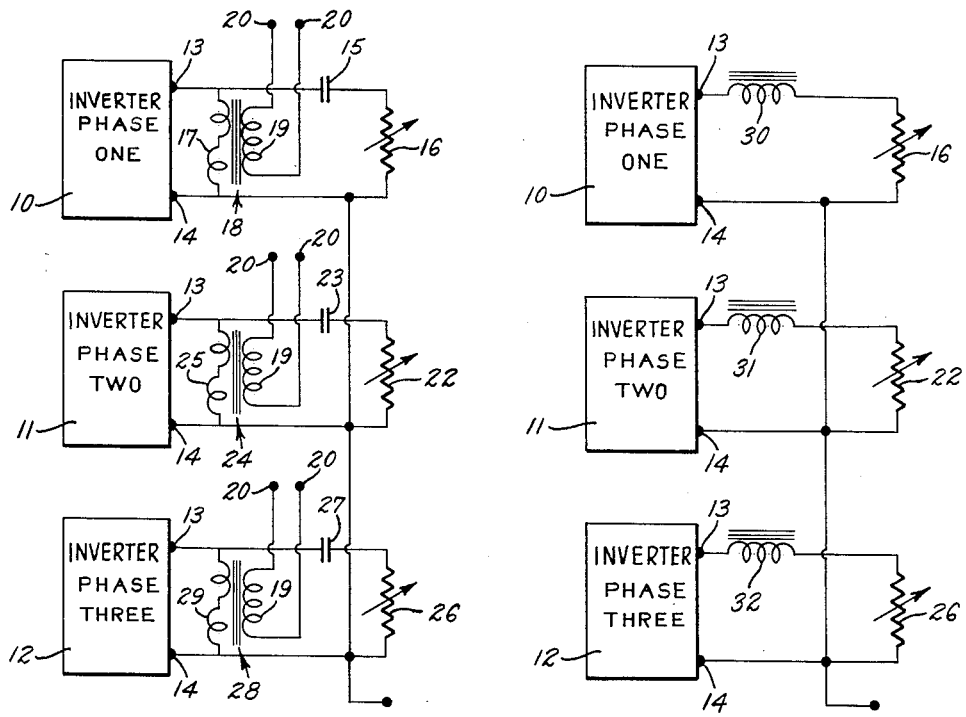
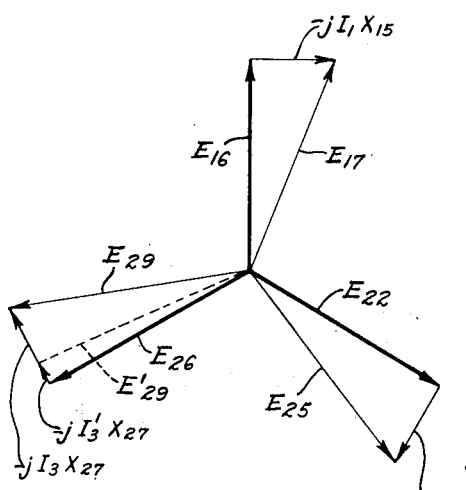
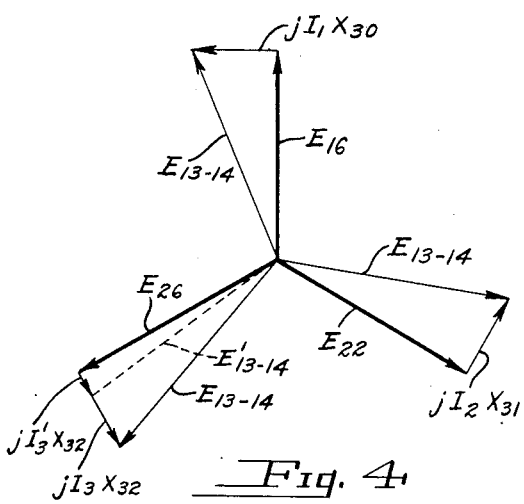
INVENTOR.
ERNEST LEVY, JR.
BY
ATTORNEY Patented Sept. 16, 1952

2,610,991

UNITED STATES PATENT OFFICE 2,610,991

PHASE BALANCE OF 3-PHASE INVERTER

Ernest Levy, Jr., Bronx, N. Y., assignor to Sorensen & Company, Inc., Stamford, Conn., a corporation of Connecticut Application April 3, 1951, Serial No. 219,108

4 Claims. (Cl. 171—119)

The present invention relates to electronic inverters for converting direct current power into alternating current power and it relates more particularly to polyphase inverters adapted to maintain a balanced phase to phase relationship even with unbalanced loads.

Simple inverters for converting direct current power into single-phase alternating current power are well known in the art. Basically, a simple inverter includes a transformer having a center tapped primary where said center tap is connected to one terminal of a source of direct current supply. The ends of the primary are then alternately connected to the other terminal of the direct current power supply. The necessary switching is usually accomplished by a pair of gas filled electron tubes known as thyratrons. Gas filled tubes are used because of their ability to handle relatively large amounts of current, which, of course, is essential if a large amount of alternating current power is desired at the output of the inverter.

The frequency of switching and hence the frequency of the alternating current output is predetermined by the application of a low power yet stable frequency alternating voltage to the grids of the thyratrons. As very little power is required for the synchronizing voltage, the oscillations may be obtained from a conventional vacuum tube oscillator.

Once a gas-filled tube, such as a thyratron, is fired, i. e., rendered conductive, it cannot be cut off by application of a negative voltage to the control grid. Instead, it is necessary to either momentarily break the plate current supply or to apply a negative voltage to the plate. This latter method is the one followed and is accomplished by means of a capacitor connected between the respective plates of the thyratrons. This capacitor is known as a commutating capacitor. During conduction of the first thyratron, a charge is placed on the commutating capacitor in such a manner that when the second thyratron is caused to conduct, a negative potential is placed on the anode of the first thyratron causing it to be extinguished.

Inverters may be provided which will convert direct current into three-phase alternating current. Basically, such an inverter consists of three separate single-phase inverters having one output terminal of each single phase inverter connected in common with the corresponding output terminal of each of the other single-phase inverters. If the synchronizing voltages applied to the control grids of the thyratrons of each single phase inverter are respectively 120° out of phase with one another, the alternating currents at the output of each inverter will likewise be 120° out of phase with one another. Thus, a conventional three-phase output may be obtained from the inverters.

It will be evident to one skilled in the art that the principles just described in connection with the generation of three-phase voltages holds equally true for the generation of any polyphase voltage. Thus, a two-phase output could be obtained by using two single-phase inverters and using two-phase synchronizing voltages. It is to be understood, therefore, that although the description of the invention will refer to three-phase voltages, the invention as disclosed herein is not so limited.

One difficulty with combining three single-phase inverters for the generation of a three-phase output is that when the loads across each phase are not equal there is a phase shift and the output is not balanced, i. e., the vectors representing the output voltage across each phase are not evenly spaced 120° apart.

It is therefore an object of this invention to provide a polyphase inverter whose phase to phase relationships will stay constant even though the loads across the respective phases are not equal.

Another object of the invention is to achieve the above object in the instance where the inverter is regulated by a saturable core reactor, by connecting a compensating capacitance in series with the load.

Still another object of the invention is to achieve the first object in the instance where the inverter is regulated by a direct current voltage control system, by connecting an inductance in series with the load.

The above and other objects of the invention may be more readily understood from the following detailed description particularly when taken in consideration with the accompanying drawing wherein satisfactory embodiments of the invention are shown. However, it is to be understood that the invention is not limited to the details disclosed but includes all such variations and modifications as fall within the spirit of the invention and the scope of the appended claims.

In the drawings:

Fig. 1 is a schematic circuit diagram of one embodiment of the invention wherein the three-phase inverter is regulated by saturable core reactor control;

Fig. 2 is a diagram showing a vector representation of voltages related to the circuit of Fig. 1;

Fig. 3 is a circuit diagram of a second embodiment of the invention wherein the three-phase inverter is regulated by a direct current control; and Fig. 4 is a diagram showing a vector representation of voltages related to the circuit of Fig. 3.

As it is agreed that inverters are well known in the art and further as my invention is concerned with the phase control of the output, the basic single-phase inverter is shown in block form in the drawing.

Referring now to Fig. 1, each single-phase inverter is shown in block form and designated respectively as single-phase inverters 10, 11 and 12, and the single-phase alternating current generated by each appears across the output terminals 13 and 14. As each inverter contributes one phase voltage to the three-phase output, the output from inverter 10 will be referred to as phase one, the output from inverter 11 as phase two, and the output from inverter 12 as phase three.

A compensating capacitor 15 is connected in series with a variable load 16 of the inverter 10 and the combination is connected across the terminals 13 and 14 of the inverter 10. The output voltage known as phase one thence appears across the load 16. As in the embodiment of Fig. 1, regulation is achieved through the use of a saturable core reactor, an alternating current winding 17 of a saturable core reactor 18 is connected across the terminals 13 and 14. The direct current winding 19 of the reactor 18 is thence connected to a pair of control terminals 20.

The components associated with the single-phase inverters 11 and 12 are connected in exactly the same way as those associated with the phase inverter 10.

Rather than designate like parts by like numbers in all instances it will be easier to follow the vector diagram of Fig. 2 if each major part has a different reference number. Hence for phase two the variable load is designated as 22, the compensating capacitor as 23, and the primary of the saturable core reactor 24 is designated as 25. Similarly, for phase three the load is designated as 26, the compensating capacitor as 27 and the primary of the saturable core reactor 28 is designated 29.

An understanding of the invention may best be obtained by considering the vector diagram of Fig. 2. First, consider phase one and assume the compensating capacitors 15 were not present. In such an instance, the load 16 would be connected directly across the winding 17 of the saturable reactor 18. Further, assume that the voltages from each phase are perfectly balanced in phase, i. e., their vectors are exactly 120° apart.

Then assume that the current in phase one decreased substantially due to a change in the load 16. This would result in a shift in the phase of the current issuing from the terminals 13 and 14. As the voltage across the terminals 13 and 14 is also the voltage across the winding 17 and the load 16, it follows that the change in load 16 resulted in a marked shift in the phase of the voltage across that load.

In a similar manner, if the compensating capacitors 23 and 27 were not present in the other phases, a change in loads 22 and 26 would likewise result in a similar phase shift of the voltages across the loads. This has been a major disadvantage of prior inverters which have been used to generate three-phase power.

At no load the inductive current drawn through reactor winding 17 of phase one is large. This decreases the effective commutating capacitance and causes the no load voltage to lead the full load voltage. Now, as capacitors act to produce voltages which lag the current, the effect of the lead may be compensated for by means of the capacitances 15, 23 and 27 and a shift in the phase of the voltages appearing across the loads 16, 22 and 26 can be prevented.

Consider now the vector diagram of Fig. 2 which illustrates certain phase relations for the embodiment of Fig. 1. The vectors shown as solid lines represent conditions when the loads 16, 22 and 26 are all equal. Taking phase three as an example, the voltage across the reactor winding 29 of the saturable reactor 28 is the vector sum of the voltages across the load 26 and the capacitor 27. Using the usual vector representation, the voltage across the capacitor 27 will be $-jIX_c$ or in the present example $-jI_3X_{27}$ which vectorially will be at right angles with the voltage vector across the load 26 as represented by the vector E26. The voltage across the reactor winding 29 is then represented by the vector E29.

Similar relations hold for the other phases when E16 and E22, respectively, are the vectors for the voltages across the loads 16 and 22. $-jI_1X_{15}$ and $-jI_2X_{23}$, respectively, are the vectors for the voltages across the capacitors 15 and 23 and E17 and E25, respectively, are the vectors for the generated output voltages which appear across the terminals 13 and 14 and across the windings 17 and 25. Thus, when all the loads are equal, the phase relationships between E16, E22 and E26 are balanced.

Assume now that the load 26 on phase three is changed by a substantial increase in impedance thereby substantially decreasing the current through the capacitor 27. Immediately the product of the current and the capacitive reactance will decrease and the vector $-jI'_3X_{27}$ will decrease to a small value as shown in Fig. 2. As the generated voltage, i. e., the voltage also across the winding 29, is the vector sum of that across the load 26 and the capacitor 27, it is apparent that the phase of the vector E29 must shift. The resultant new position of E29 is shown by the dotted line E'29 of Fig. 2. There is thus no shift in the relative position of the vectors E16, E22 and E26 and the phases remain balanced. If, however, the capacitor 27 was not present, the undesirable condition heretofore described would be in effect and the phase of the voltages across the load 26 would shift.

Reference is now made to Fig. 3 which illustrates another treatment of the problem of phase shift with changing loads. If a direct current type regulator is used to control the magnitude of the voltage output, rather than the saturable core reactor, such as envisioned in the embodiment of Fig. 1, no coils such as 17, 25 and 29 of Fig. 1 are present across the loads. In this case the tendency in an uncompensated circuit is for the full load voltage to lead the no load voltage, exactly opposite from the condition of Fig. 1. Now, as inductances produce voltages which lead the current, the compensation may be provided for by connecting an inductance in series with the load.

In Fig. 3, the inverters 10, 11 and 12 are the same as those of Fig. 1. Similarly, the loads 16, 22 and 26 are the same. Compensating inductances 30, 31 and 32 are connected in series with loads 16, 22 and 26, respectively. As heretofore mentioned, as the regulation is obtained by direct current control rather than by use of a saturable core reactor, the full load voltage would tend to lead the no load voltage rather than lag as was the tendency in the embodiment of Fig. 1.

The vector relations are similar to those for the embodiment of Fig. 1 and are shown in Fig. 4. The voltage across the output terminals 13 and 14 of inverter 12 is the vector sum of the voltage across load 26 and inductance 32. The solid vectors indicate the relation under balanced loads and by way of example, in phase three the voltage across the inductance 32 is $jI_3X_{32}$ and vectorially is 90° from the vector E26 representing the voltage across the load 26. The vector sum of the two is shown as the vector E13—14 which represents the voltage across the terminals 13 and 14.

If now the load 26 is changed by a substantial increase in impedance and a corresponding decrease in current the voltage across the inductance 32 will decrease and the voltage E13—14 will change phase but the phase relation between the vectors E16, E22 and E26 will stay fixed. Thus, the relationships are similar to those shown in Fig. 2 and an unbalance in load results in a phase change in the generated voltages appearing across the terminals 13 and 14 but the phase relationship of the voltages across the loads remains fixed.

Having thus set forth the nature of my invention, what I claim is:

1. A phase balancing circuit for a polyphase inverter comprising, output terminals for each inverter phase for connection to a load, and a reactor in series arrangement between each inverter phase and the associated load, said reactor having a reactance value sufficient to compensate for the phase change when the load is varied.

2. A phase balancing circuit for a polyphase inverter comprising, output terminals for each inverter phase, a controllable inductor connected across said output terminals for controlling the voltage, a load circuit and a capacitor connected in series arrangement across the output terminals, said capacitor having a reactance value sufficient to compensate for the phase change when the load is varied.

3. A phase balancing circuit for a polyphase inverter comprising, output terminals for each inverter phase, a saturable reactor connected across said output terminals for controlling the voltage by means of a variable direct current, a load circuit and a capacitor connected in series arrangement across the output terminals, said capacitor having a reactance value sufficient to compensate for the phase change when the load is varied.

4. A phase balancing circuit for a polyphase inverter comprising, output terminals for each inverter phase, a voltage regulator circuit connected to said terminals, said regulator circuit having an inductive reactance, a load circuit and a capacitor connected in series arrangement across the output terminals, said capacitor having a reactance value sufficient to compensate for the phase change when the load is varied.

ERNEST LEVY, JR.

REFERENCES CITED

The following references are of record in the file of this patent:

UNITED STATES PATENTS

| Number | Name | Date |
|---|---|---|
| 1,658,906 | Slepian | Feb. 14, 1928 |
| 2,233,416 | Klemperer | Mar. 4, 1941 |
| 2,316,594 | Kaestle | Apr. 13, 1943 |
| 2,403,891 | Lamm | July 9, 1946 |